Aug. 2, 1938.    C. ANDERSON ET AL    2,125,707
MACHINE FOR SECURING FASTENER ELEMENTS
Filed May 10, 1935    7 Sheets-Sheet 1

Fig. 1.

INVENTORS
CARL ANDERSON
GEORGE B. BAEHR
GILMAN M. GAY
BY  CHARLES T. MANVILLE

ATTORNEY.

Aug. 2, 1938.   C. ANDERSON ET AL   2,125,707
MACHINE FOR SECURING FASTENER ELEMENTS
Filed May 10, 1935   7 Sheets-Sheet 3

INVENTORS
CARL ANDERSON
GEORGE B. BAEHR
GILMAN M. GAY
CHARLES T. MANVILLE
BY
ATTORNEY.

Aug. 2, 1938.   C. ANDERSON ET AL   2,125,707
MACHINE FOR SECURING FASTENER ELEMENTS
Filed May 10, 1935   7 Sheets-Sheet 7

INVENTORS
CARL ANDERSON
GEORGE B. BAEHR
GILMAN M. GAY
CHARLES T. MANVILLE
BY
ATTORNEY.

Patented Aug. 2, 1938

2,125,707

UNITED STATES PATENT OFFICE 2,125,707

MACHINE FOR SECURING FASTENER ELEMENTS

Carl Anderson, George B. Baehr, and Gilman M. Gay, Waterbury, and Charles T. Manville, Woodbury, Conn., assignors to United States Rubber Products, Inc., New York, N. Y., a corporation of Delaware Application May 10, 1935, Serial No. 20,806

36 Claims. (Cl. 153—1)

Our invention relates to a machine for securing fastener elements of the slide fastener type to tape edges.

Machines for fastening the small fastener elements, which are interlocked by a slider to the edges of the supporting tapes have heretofore generally comprised reciprocating mechanisms of considerable weight so that if the machines were run at high speeds, dangerous vibrations or pounding occurred. Also the prior machines have been relatively heavy and complicated so that they were permanently mounted, and in case of repair the machines had to be stopped and disassembled in situ.

By our invention we provide a light machine which has no heavy reciprocating mechanisms, and which is light and readily transportable so as to be replaceable with its base if need for repairs should arise. Also the number of parts has been reduced and simplified to provide a machine of simple design, having a minimum number of moving parts, which is light, which is easy of adjustment, and which may be operated at high speeds and at low cost for power, repair and initial outlay. In general the moving parts of the machine are actuated by cams attached to various shafts, thereby dispensing with many of the reciprocating parts heretofore found in such machines.

Various improvements have been made in the submechanisms for handling the tape and the elements, for counting, for skip-feeding, for clamping, etc., which will appear from the following detailed description.

The accompanying drawings illustrate a present preferred embodiment of the invention, in which:

Fig. 22 is a plan view of a detail of the element restraining mechanism;

Figure 1:
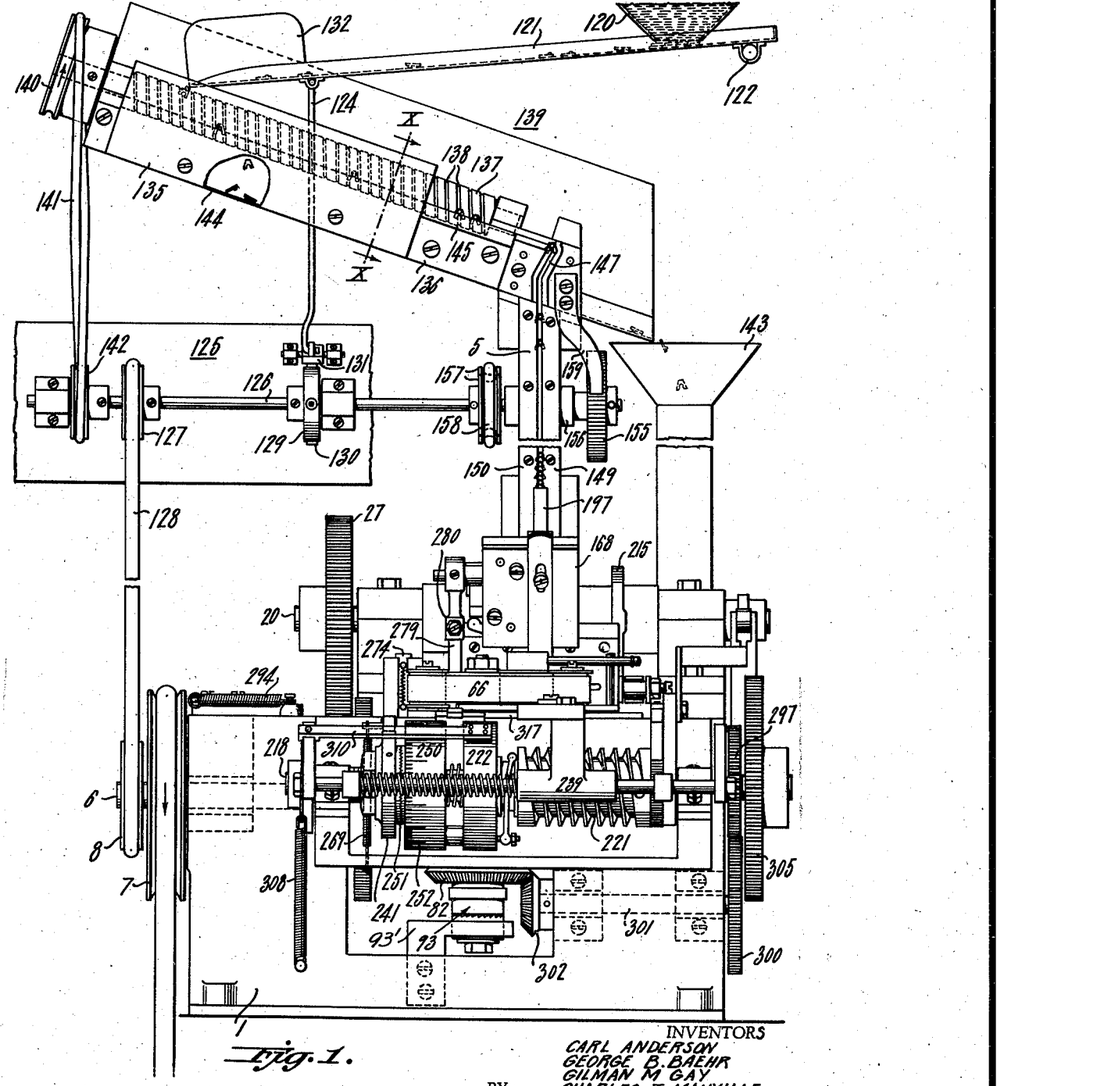
Fig. 1 is a front elevational view of a machine embodying our invention.
Figure 2:
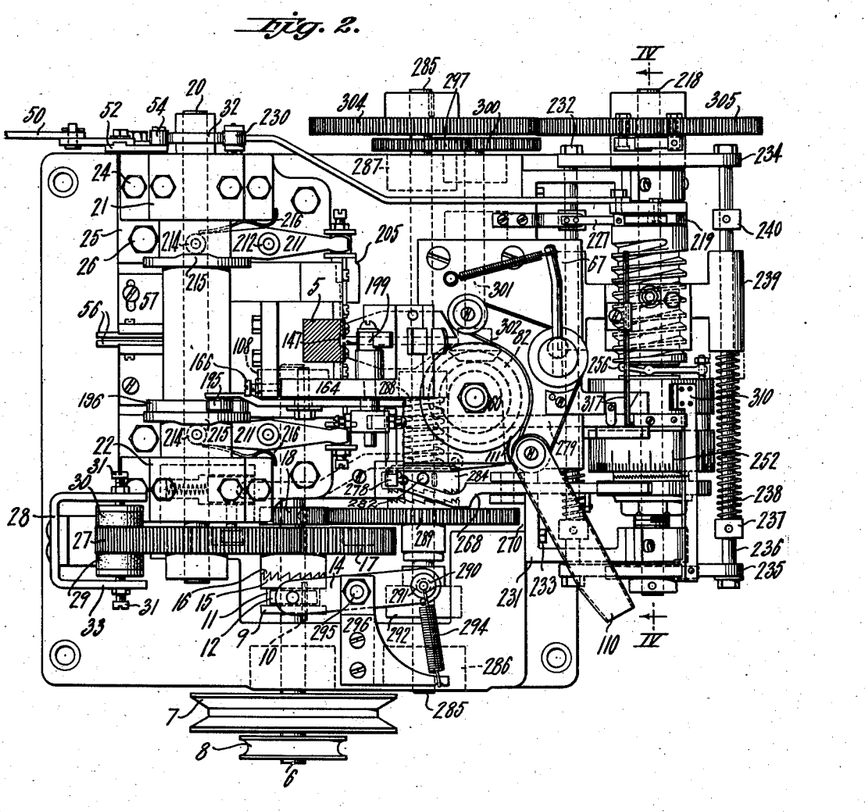
Fig. 2 is a broken plan view of the machine.

Broadly, the machine may be described by referring to the various sub-mechanisms. The relative interconnection of the parts and the driving mechanism is broadly shown in Figs. 1, 2, and 3. The tape feeding mechanisms are shown by reference to Figs. 2, 7, and 23 to 27, inclusive. The mechanism for handling the fastener elements is shown in Figs. 1, and 10 to 22, the element clamping mechanism being particularly shown in Figs. 2, 16, and 17. The element counting mechanism in its normal operation is best shown in Figs. 1, 2, and 4, while the operation thereof during the periods of skip feeding and re-setting are additionally shown in detail in Figs. 25 to 27. A commercially practical speed for the operation of this machine is at the rate of 750 element fastening operations per minute or 750 feedings of the tape, but it is to be understood that other speeds may be used, as desired.

Main power drive

Figure 3:
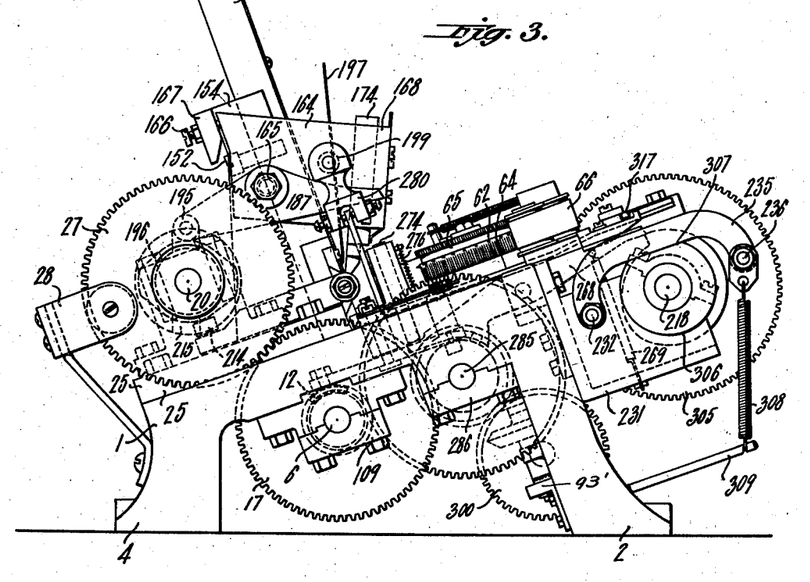
Fig. 3 is a side elevational view of the machine, a portion of the chute being removed.
Figure 4:
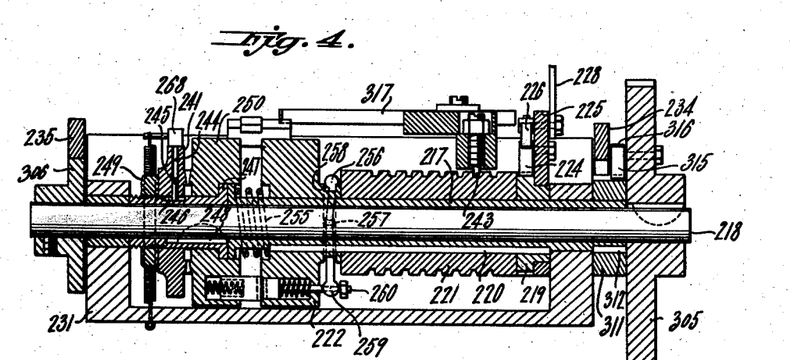
Fig. 4 is a sectional view of the spacing, counting, and skip-feeding mechanism taken substantially on the section line IV—IV of Fig. 2.

Referring particularly to Figs. 1, 2, and 3, the machine comprises a base 1, whose forward legs 2 are longer than the rear legs 4 in order that the face of the base shall be tilted rearwardly at an angle, which is illustrated to be in the neighborhood of 20 degrees, to the horizontal. The component parts of the mechanism are assembled in substantially rectangular relation to the surface of the base 1. With this construction the chute 5 for feeding the elements is given an inclined position to the horizontal which causes the elements to lie against the back wall of the chute, thereby avoiding many constructional complications which would arise were the chute set at an angle to its base.

A main drive shaft 6 is mounted under the base 1 in bearings 108 and 109, Fig. 3, provided with a pulley 7 for connection to a source of power (not shown). A second pulley 8 is provided on the shaft for driving the mechanism for feeding elements, as hereinafter described. The shaft 6 is continuously driven and all movements of other parts of the apparatus are selectively controlled from this shaft.

Referring particularly to Figs. 2 and 3, a clutch collar 9 is slidably mounted on a key 10 which is seated in the shaft 6 so that the collar 9 continuously rotates. The collar 9 is provided with a groove 11 in which rides a block 12 pivotally mounted near one end of a lever 14. The outer end of the collar 9 is provided with clutch teeth 15 which mesh with teeth 16 on a pinion 17 which is rotatably mounted on the shaft 6. The engagement and disengagement of the clutch teeth 15 and 16 controls the normal feeding and fastening operations of the machine. A second pinion 18 (particularly illustrated in Fig. 26) is keyed to the shaft 6 and drives the re-setting and skip-feeding mechanism, as hereinafter described, when the clutch teeth 15 and 16 are disengaged. Accordingly, in the following description of the various parts of the machine and their operations, the shaft 6 will be used as a basic element.

Tape feeding mechanism

The mechanism for feeding the tape 19 to which the elements are attached is best illustrated in Figs. 2, 7, and 23 to 27. The apparatus for feeding the tape during the normal clamping operations will first be described and the skip-feeding mechanism will be described subsequently. An actuating shaft 20 is mounted in bearings 21 and 22 attached by bolts 24 to a secondary bedplate 25 which, in turn, is attached by bolts 26 to the base 1. The secondary plate 25 carries the chute 5 and the clamping mechanism, as hereinafter pointed out, so that the shaft 20 and the chute 5 may be removed as a unit from the base 1 and readily replaced, as desired.

A gear 27 is keyed to the shaft 20 and meshes with the pinion 17 on the shaft 6. Because of the high speed at which the machine operates, it is desired that the gear 27 and the pinion 17 will stop when the pinion 17 is released from the collar 9 so that a friction brake 28 is attached to the base 1. The brake 28 comprises blocks 29 and 30, preferably of wood, which bear against the opposite sides of the gear 27. The blocks 29 and 30 are supported by adjusting screws 31, extending through supporting arms 33. At one end, the shaft 20 is provided with a cam 32 having two high points whereby each revolution of the shaft 20 produces two operations of the cooperating mechanisms. The cam 32 controls the feeding of the tape through the machine.

Figures 7, 8:
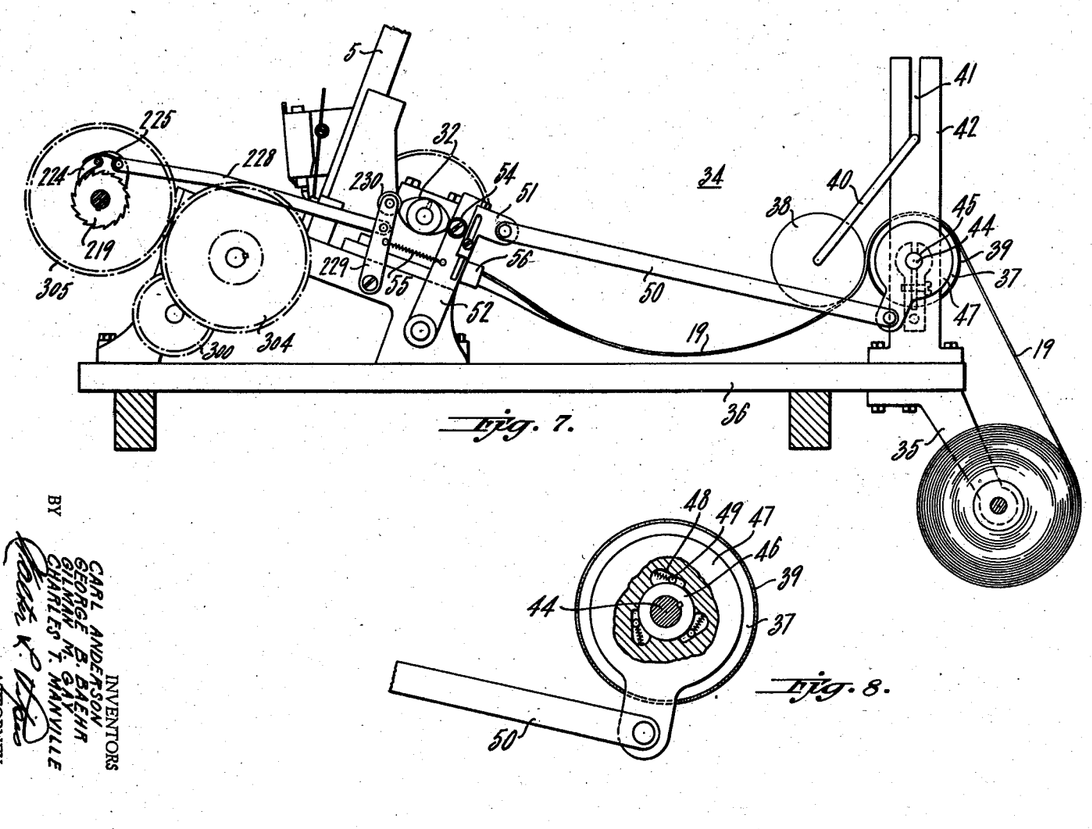
Fig. 7 is a side elevational view of a mechanism for preliminarily feeding tape.
Fig. 8 is an enlarged view of a detail of the mechanism.

In order to unreel the tape 19 and introduce it into the machine in substantially untensioned state there is provided a mechanism shown generically by numeral 34 in Fig. 7. This mechanism comprises a reel or spool holder 35 which is mounted on any suitable support adjacent to the machine base 1, although preferably it is on a table 36 supporting the base 1. The tape 19 is fed around a roller 37 and under a floating roller 38 so that the tape is positively held against the roller 37 and slippage does not occur. Preferably, although not necessarily, the roller 37 is given a friction surface 39 of sand, gravel, or other suitably gripping material. The roller 38 is secured by a link 40 to slots 41 in spaced brackets 42, only one being illustrated. The roller 37 is mounted on a shaft 44 which rests in suitable brake bearings 45 attached to the brackets 42.

As shown in Fig. 8, the shaft 44 is driven by a clutch comprising a collar 46 keyed to the shaft 44. A disc 47 is rotatably mounted on the collar 46 and is provided with a number of elongated openings 48, which are wider at one end than at the other. A spring pressed roller 49 is mounted in each of the openings 48. The disc 47 is connected to a reciprocating link 50. As the link 50 is moved to the left of Fig. 8, the disc 47 turns in a clockwise direction on the shaft 44 thereby releasing rollers 49 and permitting the disc to freely turn on the collar 46. However, when the link 50 moves to the right of Fig. 8, the rollers 49 are guided into the narrow ends of the openings 48 to grip the collar and cause the shaft 44 to turn thereby advancing the tape by the desired amount.

The link 50, in turn, is connected to a block 51 adjustably mounted on an arm 52 attached to the base 1. The arm 52 carries a cam follower 54, which is urged into engagement with the cam 32 by a spring 55. By adjusting the position of the block 51 the throw of the link 50 may be controlled which, in turn, controls the amount of tape fed forward at each oscillation of the arm 52. The mechanism 34 delivers the tape in an untensioned state to guide plates 56.

Figures 23, 24, 25, 27:
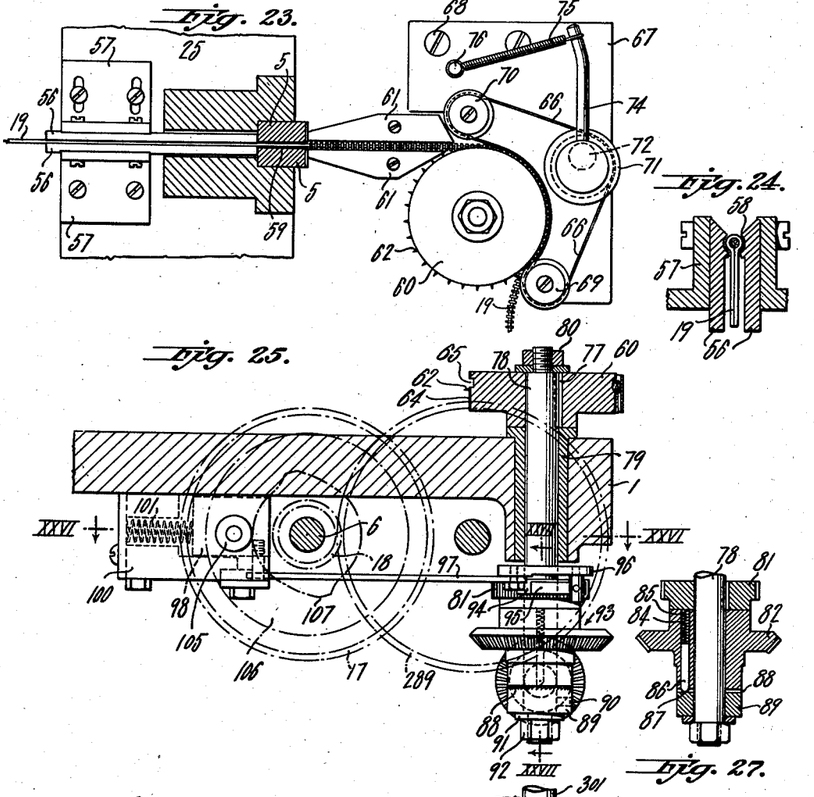
Fig. 23 is a plan view of the tape feeding mechanism.
Fig. 24 is a cross-sectional view of the tape guiding plates.
Fig. 25 is a developed side elevational view of a portion of the mechanism.
Fig. 27 is an enlarged sectional view of a detail of the mechanism taken along the section line XXVII—XXVII of Fig. 25.

As shown in Fig. 23, the guide plates 56 are secured to brackets 57 which are mounted on the base 1. The tape engaging edges of the plates 58 are preferably slightly bevelled and at least one of the brackets 57 is adjustably mounted so that various widths of tape may be fed.

Figures 9, 10, 11, 12, 13, 14, 15:
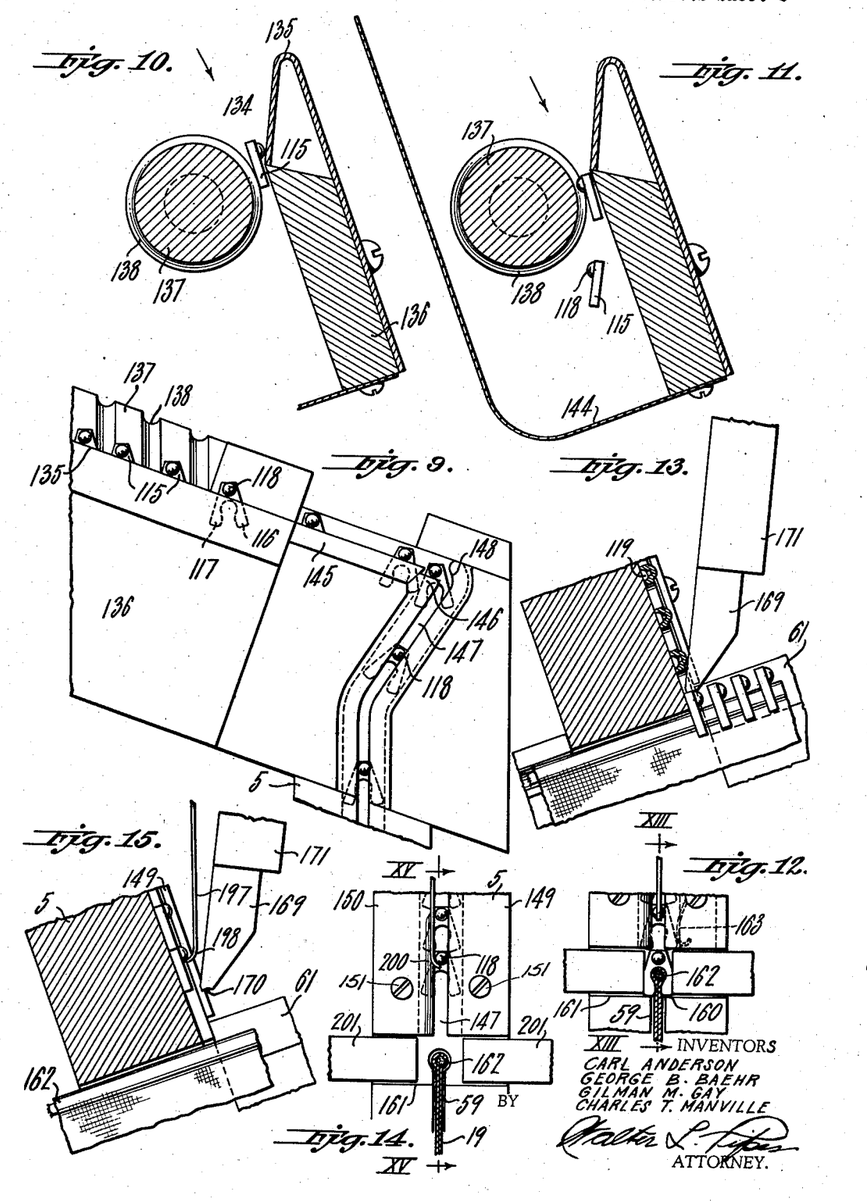
Fig. 9 is an enlarged view of a portion of the element sorting and feeding mechanism.
Fig. 10 is a diagrammatic view illustrating the movement of a fastening element in the correct position at the section line X—X of Fig. 1.
Fig. 11 is a similar view showing the operation of the mechanism when the element is in a wrong or reversed position.
Fig. 12 is an enlarged face view showing the clamping of an element to the tape.
Fig. 13 is a sectional view taken along the section line XIII—XIII of Fig. 12.
Fig. 14 is a view somewhat similar to Fig. 12 showing the element restraining means in operation.
Fig. 15 is a sectional view of the mechanism taken along the section line XV—XV of Fig. 14.

As shown in Fig. 24, the tape engaging edges of the plates are not smooth but are given a configuration such that they collectively form the outline of the shape of the tape which passes therethrough. This is particularly important since a throat 58 is provided which fits about the corded edge of the tape and supports the tape in the correct vertical position to feed the tape into and through an opening 59 in the base of the chute 5 where it receives the fastening elements. The position of the tape 19 as it emerges from the slot 59 is shown in Fig. 14.

The tape is drawn through the slot 59 and between plates 56 by the frictional engagement with a feed wheel 60. Guide plates 61 conduct the tape with the attached fasteners from the slot 59 to the feed wheel 60. The feed wheel 60 may be provided on its face with pins 62 and teeth 64 which insure a positive grip of the tape. As is shown in Fig. 3, the feed wheel is provided with a groove 65 which accommodates the attaching fastener elements as the tape is fed around the feed wheel. The provision of the pins 62 and teeth 64 is of considerable importance in the skip-feeding operation of the apparatus, hereinafter described, as the tape is then pulled forward at a very high speed and any slippage between the tape and the feed wheel would result in shortening the spaces between series of elements.

A further improvement in the frictional engagement of the tape with the feed wheel 60 is a belt 66, preferably of rubberized fabric, which is trained around a portion of the feed wheel to engage the tape and hold it against a portion of the periphery of the feed wheel. The belt 66 is carried by a plate 67 which is attached to the base 1 by screws 68. Spaced pulleys 69 and 70 are carried by the plate 67 and are so positioned as to train a reach of the belt into its tape clamping position against the feed wheel 60. For tensioning the belt 66, it is trained around a third pulley 71 which is carried by an eccentrically mounted shaft 72. A lever 74 is secured to the top of the pulley shaft and its outer end is attached to a spring 75 which, in turn, is secured to an anchor 76 in the plate 67. By this construction, the pulley 71 is continuously urged outwardly in a counterclockwise direction against the belt 66 thereby insuring a uniform tension in the belt.

As illustrated in Fig. 25, the feed wheel 60 is secured by a key 77 to a shaft 78 which extends vertically through a bushing 79 on the base 1. A nut 80 is secured to the end of the shaft 78 for retaining the feed wheel 60. Below the base 1, a ratchet wheel 81 is keyed to the shaft 78. As shown in detail in Fig. 27, a bevelled gear 82 is loosely mounted on the shaft 78 below the ratchet wheel 81. The bevelled gear 82 is used in the skip-feed motion, hereinafter described. A socket 84 in the hub of the gear 82 houses a spring 85 and a pin 86, which terminates in a sharp end 87. The end 87 of the pin cooperates with clutch teeth 88 on a collar 89 which is fixed to the shaft 78 by a set screw 90. A washer 91 and a nut 92 complete the shaft assembly 93. A semi-circular steadying bearing 93' for the shaft may be provided to engage the collar 89 and prevent whipping of the shaft, as shown in Figs. 1 and 3.

With this construction the ratchet wheel 81 and the collar 89 are free to move in a clockwise direction while the gear 82 idles. If, however, the gear 82 is turned in a clockwise direction the sharp end 87 of the pin 86 engages the teeth 88 and causes the shaft 78 to turn in the clockwise direction.

Figure 26:
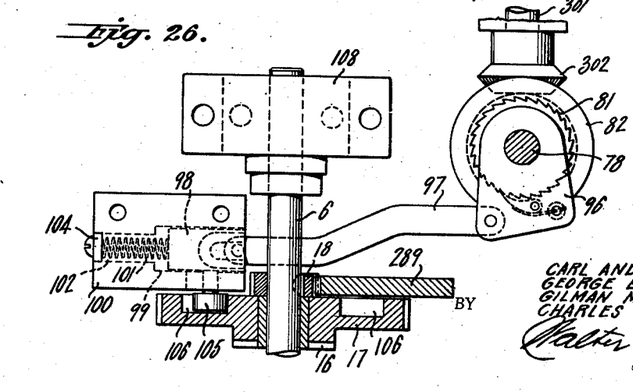
Fig. 26 is a plan view, partially in section, of the portion of the operating mechanism taken substantially along the section line XXVI—XXVI of Fig. 25.

A pawl 94 for actuating the ratchet wheel 81 is urged into its engaging position by a spring 95. The spring 95 and the pulley 94 are mounted on a plate 96 which is loosely mounted on the shaft 78. The plate, in turn, is connected to an actuating link 97, as illustrated in Fig. 26.

The other end of the link 97 is attached to a block 98 which travels in a slide 99 in a guide block 100 secured to the undersurface of the base 1, as shown in Fig. 25. The block 98 bears against a spring 101 mounted in a slot 102 in the guide block 100. The opening 102 is closed by a cap 104 which may also serve to tension the spring 101. With this construction the block 98 is normally urged to the right of Fig. 26. A cam roller 105 is attached to the block 98 through a slot in a side of the block 100. The cam roller 105 follows a groove 106 on the inner surface of the pinion 17. The inner surface of the groove 106 is provided with two high points 107 both of which serve to pull the plate 96 to the left thereby advancing the shaft 78 by the length of two of the teeth on the ratchet wheel 81 with each revolution of the shaft 6. If the number of teeth on the pinion 17 and on the gear wheel 27 are the same, the cam 32 may advance the tape by the same amount with each revolution of the shaft 6. It is to be understood that the ratios of the pinion 17 and the gear 27 and the various other gears may be varied as desired to accomplish different timing.

As the cam 32 is idle during the skip-feeding operation, as hereinafter described, it is desirable that the throw of the link 50 be adjusted to cause the roller 37 to operate a little faster than the peripheral speed of the feed wheel 60, thereby accumulating sufficient slack in the mechanism 34 to compensate for the skip feed movement of the feed wheel 60 without tensioning the tape 19 as it is introduced into the guide plates 56.

With the foregoing construction when the clutch teeth 15 and 16 mesh and the shaft 6 is rotated, the tape 19 is unwound by the mechanism 34 and is drawn between the guide plates 56 through the slot 59 in the chute 5 and around the feed wheel 60 by the rotation of the latter in normal operation.

As best shown in Fig. 2, the tape, after leaving the feed wheel 60, passes through a discharge chute 110 delivering the finished tape to the side of the machine. The chute 110 is provided with a stripper piece 111 which serves to pull the tape 19 away from the pins 62 on the feed wheel 60 thereby insuring entry of the tape 19 in the chute and free of the wheel.

*Feeding of the fastener elements*

Referring particularly to Figs. 1, and 10 to 22, inclusive, the mechanism for feeding the fastener elements will now be described.

First referring to Figs. 9 to 13, each fastener element 115 comprises a stamped body having separated diverging legs 116 and 117 at one end and a lug 118 projecting from one side of the body at the other end. A recess 119 is formed behind each lug 118 for the reception of a complementary lug in an associated fastener in a well known manner. The space between the legs 116 and 117 is of the general contour of the tape edge, but is somewhat larger. When the elements are applied to the tape, the lugs 118 all face in the same direction so that each lug 118 will seat in a recess 119 in an adjacent element on the opposing tape. Accordingly, it is of extreme importance that the elements shall be fed to the clamping means in a proper position.

Referring particularly to Fig. 1, the elements in large quantity are placed in a hopper or reservoir 120 from the bottom of which they fall into a chute 121. Preferably, the chute and hopper are mounted at one end on a hinge 122 and the other end of the chute is supported by a rod 124 which is connected to an agitating device shown generically by a reference numeral 125.

The agitating device 125 comprises a shaft 126 which is driven through a pulley 127 by a belt 128 connected to the pulley 8. A hub 129 is mounted on the shaft 126 and is provided with small set screws 130 which engage a rocker arm 131 to which the rod 124 is attached. The amount of the vibration can be controlled by the setting of screws 130. Accordingly, the chute 121 and the reservoir 120 are given a continuous gentle vibratory action. This causes the elements to move from the hopper 120 and slide down the chute 131.

A wing plate 132 at the end of the chute directs the elements into a space 134 formed between an upstanding edge 135 of a plate 136 and a longitudinally extending roller 137 having a helical groove 138 along its outer periphery. The roller 137 rests in bearings placed in a supporting housing 139 for the roller and the plate 136. The housing 139 is attached to and is supported by the chute 5, as shown in Fig. 1. The roller 137 is driven through a pulley 140 by a belt 141 which, in turn, is driven by a pulley 142 on the shaft 126.

The elements fall from the end of the chute 121 into the space 134 in an indiscriminate manner with respect to the direction in which their respective lugs 118 project. If the lugs 118 project outwardly toward the edge 135, which is the correct position, as illustrated in Fig. 10, the lugs engage the edge and the elements are prevented from falling between the edge and the roller. The wide spread legs 116 and 117 straddle the groove 138 and as the roller 137 turns, the elements move downwardly along the edge 135 which is set in a slanting position.

As is shown in Fig. 11, the elements which have their lugs 118 projecting inwardly soon settle into a position where the lugs fall into the groove 138 whose depth and width is greater than the dimensions of the lugs so that the elements fall through the space between the edge 135 and the roller 137. These rejected elements then pass along the bottom 144 of the supporting housing and ultimately are discharged into a funnel 143.

The edge 135 conducts the elements on to a plate 145 (Fig. 9) which, in turn, leads to a small shelf 146 which is only long enough to accommodate a single element. The shelf 146 is slightly below the edge of the plate 145 so that each element drops slightly as it comes onto the shelf and pushes the preceding element into a slot 147 in the chute 5. Opposite the shelf 146 the edge of the slot 147 is given a distinct curve 148 so as to insure that the lugs 118 on the successive elements have to travel outwardly and away from the end of the shelf 146 thereby insuring that the elements are correctly aligned as they enter the slot 147.

The chute 5 comprises a long bar of metal and has the slot 147 formed in its outer face, as shown in cross-section in Fig. 2. Small guide plates 149 and 150 are secured by screws 151 to the bar and overhang the slot 147, the spacing between the edges of the plates 149 and 150 being just large enough to permit the lugs 118 to move downwardly therebetween. As previously stated, the chute 5 is inclined about 20 degrees to the vertical so that the elements will tend to rest against the rear surface of the slot 147 and not bear against the plates 149 and 150. The bottom of the chute 5 is secured by a bolt 152 (illustrated in Fig. 3) to a pedestal 154 integral with the secondary base plate 25.

In order to give the chute 5 and the housing 139 a vibratory motion, which assists in moving the elements into the slot 147, a toothed wheel 155 is mounted in bearings 156 to the rear of the chute 5 and near the top thereof. The wheel 155 is driven from the shaft 126 through pulleys 157 and belt 158. A spring 159 is attached to the housing 139 and bears against the teeth on the wheel 155 so that as the latter turns a slight vibratory movement is imparted to the chute 5 and the housing 139.

The legs of the succeeding elements normally bear against the tops of the preceding elements, as shown in Figs. 13 and 14, until they arrive opposite the clamping mechanism, shown in Figs. 12 and 14. Here the legs of the lowermost element bear against the ledges 160 and 161 formed in the chute 5 and which constitute a forward edge of the slot 59 through which the tape 19 travels. It is to be noted, however, that the upper edges of the ledges 160 and 161 are far enough below the upper or corded edge 162 of the tape 19 so that when the legs 116 and 117 of the elements rest thereon the corded edge 162 of the tape is seated in the top of the space between the legs 116 and 117 in which position it is to be clamped on the tape. After each element is clamped to the tape, it is drawn forwardly and off the ledges 160 and 161 by the advancing tape and is replaced by the succeeding element which falls into position on the ledges. If desired, a spring 163 may be housed in the chute 5 beneath the plate 149 to hold the succeeding elements rather than placing their weight upon the element being clamped.

*Element positioning means*

In order to insure uniform spacing of the elements on the tape, it is desirable to provide a positive mechanism for forcing the succeeding elements into their positions on the ledges 160 and 161 and straddling the edge 162 of the tape 19. The mechanism for accomplishing this purpose is particularly shown in Figs. 3, 12, 13, 18, and 19.

Figures 16, 17, 18, 19, 20, 21:
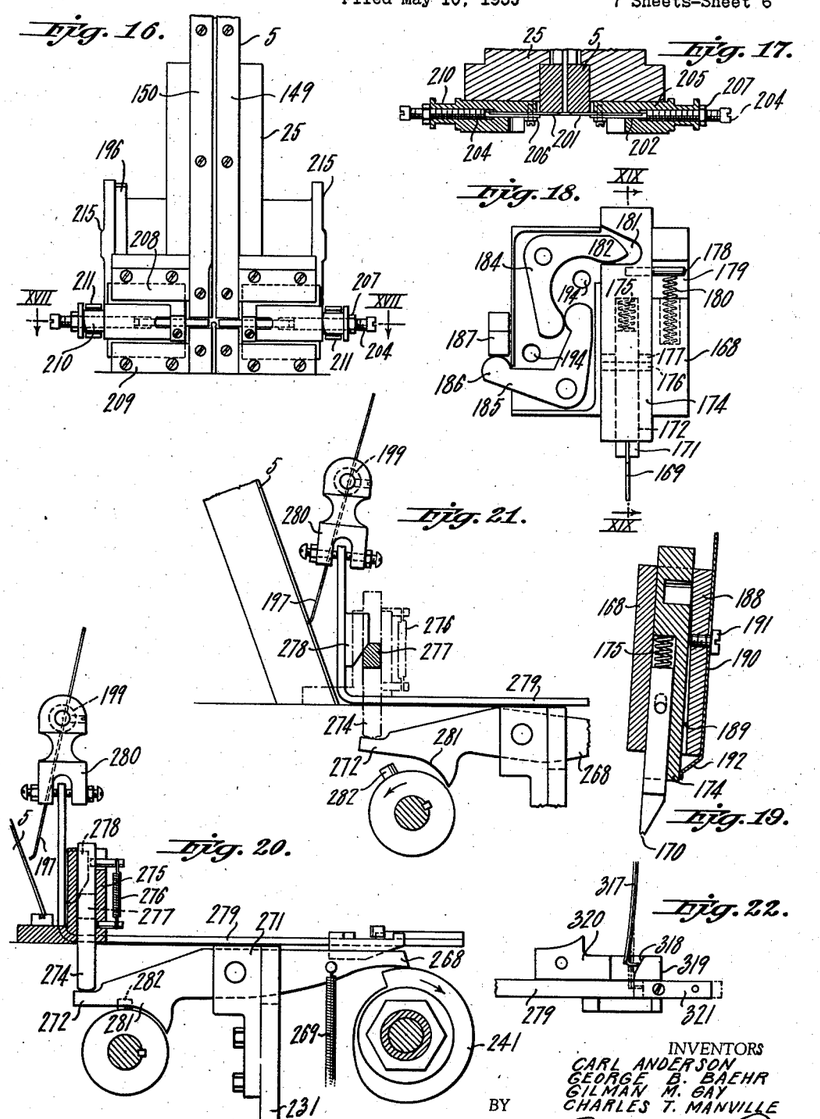
Fig. 16 is an elevational view of the element clamping mechanism.
Fig. 17 is a sectional view thereof taken along the section line XVII—XVII of Fig. 16.
Fig. 18 is a detail view of the mechanism for positioning the elements on the tape, a portion being removed.
Fig. 19 is a sectional view thereof taken along on the sectional line XIX—XIX of Fig. 18.
Fig. 20 is a side view of the operating mechanism for the element restraining means in an operative position.
Fig. 21 is a similar view showing the mechanism in an inoperative position.

Referring to Fig. 3, a bracket arm 164 is secured by a clamping bolt 165 to the chute pedestal 154. The angular position of the bracket arm may be regulated by an adjusting screw 166 carried by a second bracket 167. The need for this adjustment will appear from the subsequent description. As shown in Fig. 2, the forward end of the bracket arm 164 projects laterally to form the rear and side walls of a housing 168. As best shown in Figs. 18 and 19, the housing 168 carries a blade 169, whose operation is shown in Figs. 13 and 14, and which is provided with a notch 170 on its lower forward edge, which notch engages the upper edge of each element and forces it onto the tape 19 and around the corded edge 162 thereof. The blade 169 is of hardened steel and is centered with respect to the slot 147.

The blade 169 is secured in an end of a plunger 171 which slides in a way 172 in a second plunger 174. A spring 175 normally urges the blade 169 and the plunger 171 downwardly against a pin 176 which moves in slots 177 in the sides of the plunger 174. The plunger 174 has a laterally projecting pin 178 which moves in a slot 179 in a side wall in the housing 168 against a spring 180. The plunger 174 extends above the top of the housing 168 and is provided with a recess 181 for the reception of an arm 182 of a bell crank 184. A second bell crank 185 is mounted to operate the bell crank 184 thereby depressing the plunger 174 against the spring 180. An arm 186 of the bell crank 185 projects laterally out of the housing 168 and is engaged by the end of a rocker arm 187. As shown in Figs. 2 and 3, the rocker arm 187 is mounted for a rocking movement on the bolt 165.

The spring 175 permits the blade 169 to retire, rather than break, if the elements become jammed in the chute 5. As a further means of relief, the face plate 188 of the housing 168 is bevelled to provide a sloping clearance 189 between its inner face and the plunger 174. A leaf spring 190 is secured by a screw 191 to the outer face of the face plate 188 and has a bent end 192 which bears against the face of the plunger 174. In case the elements become jammed in the chute, the blade 169 may retreat against the spring 175 by the length of the slots 177 and if that does not offer sufficient relief the plunger 174 may move laterally against the end of the spring 192. The spring 192 also permits the end 170 of the blade to depart from a straight line motion as the elements are forced downwardly in the chute during normal operation.

The housing 168 is provided with bolt holes 194 for the reception of bolts for securing of the face plate 188. Because of the high speed at which the machine operates and because of the small size of the fastener elements, the angle at which the plate 169 is set relative to the back wall of the chute 5 and the elements is very important. In the operation of the blade 169, as is shown by comparison of Figs. 13 and 15, the blade 169 engages the top of an element and follows it until it is seated on the tape, when it must retreat rapidly enough and far enough to clear the succeeding element. This is accomplished in part by the action of the spring 180 and in part by the angular setting of the housing 168 relative to the chute 5. As has previously been stated, the inclination of the chute 5 is such as to have the elements normally bearing against the rear wall of the slot 147.

As is shown in Fig. 3, the rocker arm 187 is directly actuated by a roller 195, engaging a cam 196, mounted on the shaft 20 and having two high points thereby synchronizing the element setting means with the tape feeding mechanism.

Element shut-off mechanism

In order that the elements in the slot 147 shall be suspended from between the clamping means during periods of their dwell in the clamping operation or periods of skip-feed for the tape, there is provided a flexible finger 197 terminating in a hook 198. The finger 197 extends through and is clamped in a hub 199 rotatably mounted in the bracket arm 164. The actuation of the hub 199 will be explained in connection with the skip-feeding mechanism.

As shown in Figs. 14 and 15, the hook 198, when moved to the element cut off position, bears against a bevelled surface 200 on the plate 150 just above the operating area for the blade 169. When the hook is depressed to engage the bevelled area, it is crowded under the lug 118 of one of the elements and squeezes the lug against the plate 149, as shown in Fig. 14, thereby holding that element and the succeeding elements suspended above the clamping means. In general, it is desired to cut off the supply of elements at least one clamping stroke before the clamping elements become inactive during any skip-feeding operation and to permit several clamping strokes at the end of the skip-feeding operation before the hook 198 disengages the lowermost element. This is to prevent the jamming, loss, or improperly spacing the elements at the beginning and end of each skip-feeding operation.

Clamping or hammering means

Referring particularly to Figs. 2, 12, 16, and 17, the clamping or hammering of the elements on the tape is accomplished by the reciprocating horizontal movements of a pair of thin blades or strips 201 of high quality steel which slide in ways sunk in the chute 5 below the ends of plates 149 and 150 and above ledges 160 and 161. As exemplary of the invention, if the overall of the height of the elements being set is of the order of .112 inch, the width of the blades is of the order of .100 inch, their thickness is of the order of 0.28 inch, which is substantially the thickness of the elements. Accordingly, the blades are slightly narrower than the overall height of the elements so that the blades 201 bear against the separated legs 116 and 117 and clamp them to the tape 19 without striking the legs of the next succeeding element which is retained by the upper portion of the element being clamped, as is shown in Fig. 12.

Because of the high quality of the metal used in the blades 201 and because of their small size they are seated in L-shaped supports 202, shown in Fig. 17. The supports 202, in turn, bear against the ends of adjustment screws 204, the entire assembly being mounted in blocks 205. Clamps 206 secure the forward ends of the blades 201 and the supports 202 to the blocks 205. When it is desired to adjust the position of the blades 201, the clamps 206 are loosened and an adjustment is made by the screws 204 until the desired stroke is obtained when the clamps 206 are tightened and jam nuts 207 are tightened to hold the screws 204. The blocks 205 slide in ways formed by plates 208 and 209 secured to the base pedestal 25. The ends of the blocks 205 are provided with recesses 210 for the yoked ends of levers 211, shown in Fig. 2. The levers 211 are pivotally mounted on the pedestal base 25 by bolts 212 and the outer ends of the levers carry rollers 214 which follow face cams 215 mounted on the shaft 20. The rollers 215 are urged into engagement with the faces of the cams 214 by springs 216 resting against the bearings 21 and 22 for the shaft 20. The faces of cams 215 have two high spots, as do all other cams on shaft 20, so that on each operation of the shaft 20, two synchronized operations are accomplished by each of the connected mechanisms.

Counting mechanism

If it were desired to continuously apply clamping elements to the tape without interruption the machine could be operated continuously with the mechanism hereinbefore described, but as it is customary to apply elements to a tape edge for a given space and then to skip a space and then again set elements for a desired length, it is necessary to provide a counting and spacing mechanism. Such a mechanism is partly shown in Figs. 1, 2, 4, and 7.

As the counting mechanism and the skip-feeding mechanism are closely allied and many of the component parts function during both operations, the normal counting operations will first be described.

Counting operation

Referring particularly to Fig. 4, the basic element of the counting mechanism, when normally operated, is a sleeve 217 which is loosely mounted on a shaft 218. The sleeve 217 carries a ratchet wheel 219 which is firmly secured thereto by a key 220. The number of teeth on the ratchet wheel 219 normally corresponds to the number of elements which it is desired to set before the skip-feeding mechanism operates. In other words, one revolution of the sleeve 219 should set a definite number of elements between these portions of the tape which are left bare. The sleeve 217 also carries an externally threaded sleeve 221 and a cylindrical stop 222, all of which turn as a unit for the purpose of controlling the clutch connection between the teeth 15 and 16 on the shaft 6 through connections, hereinafter described, whereby the connection of the clutch teeth 15 and 16 is controlled by the turning of the sleeve 217 by the ratchet wheel 219.

The ratchet wheel 219 is actuated by a pawl 224 mounted on a disc 225 which is rotatably mounted on a hub of the ratchet wheel 219. A spring 226 serves to press the pawl 224 against the teeth of the ratchet wheel 219 and a second spring 227 mounted on the base 1 serves as a drag on the ratchet wheel. The disc 225 is attached to a link 228, the other end of which is attached to a lever 229 (Fig. 7) carrying a roller 230 which bears against the cam 32 under the influence of the spring 55. With this construction the sleeve 217 is driven by the shaft 20 so that its motion is synchronized with the motion of the tape feeding mechanism, the element feeding mechanism and the clamping mechanism, during the normal operation.

The shaft 218 is mounted in a separate frame 231 which is attached by bolts 233 to the forward or longer legs 2 of the base 1. The frame supports a rod 232 which may turn in its bearings. Arms 234 and 235 are rockably secured to the frame by the opposite ends of the rod 232. The arms 234 and 235 span the shaft 217 and its supplementary parts and terminate in a second rod 236, thereby forming a carriage supporting frame. Collars 237 are secured near the ends of the rods 232 and 236 away from the ratchet wheel 219. Coil springs 238 abut the collars 237. A carriage 239 is supported by the rods 232 and 236 and is slidable therealong. Collars 240 on the rods limit the movement of the carriage toward the ratchet wheel 219. The carriage 239 abuts the springs 238 and its movements are subject to the tension therein.

At detent or tooth 243 is carried by the carriage 239 and engages the thread on the surface of the sleeve 221. The pitch of the thread on the sleeve 221 is such that as the ratchet wheel 219 turns, the carriage is moved forward, or to the left of Fig. 4, to compress the springs 238. As the forward movement of the carriage is controlled by the rotation of the ratchet wheel 219, the travel of the carriage can be made such that when it starts from the position determined by the collars 240 it will travel one or more revolutions of the ratchet wheel 219 before the clutch teeth 15 and 16 are separated for the skip feeding movement hereinafter described.

The movement of the carriage 239, through a mechanism, shortly to be described, controls the movement of a cam wheel 241. As shown in Fig. 4, the cam 241 is provided with a radial opening 244 in which a pin 245 is seated for engaging a slot 246 in the face of a sleeve 247 which serves as a hub for the cam 241. The sleeve 247 is secured by a key 248 directly to the shaft 218. The cam 241 is clamped in position by a lock nut 249.

A cylindrical stop 250 is carried by the sleeve 247. The meeting faces of the stop 250 and the cam 241 are provided with complementary teeth 251 so that the setting of the high point on the cam 241 can be varied slightly—that is either forwardly or rearwardly—if desired, to add a few more or a few less elements to the tape than are normally provided by the number of teeth on the ratchet wheel 219. Preferably, the face of the stop 250 is provided with indicia 252 to assist in adjusting the relative positions of the teeth 251. Accordingly, the stop 250, the cam 241, and the shaft 218 operate as a unit and are normally inactive when the sleeve 217 is turning.

The mechanism by which the stop 222 operates to transmit motion to the stop 250 will now be described. A spring 255 normally holds the stop 222 away from the stop 250 and for this reason the stop 222 is slidable longitudinally, but non-rotatably, on the sleeve 217. As the carriage 239 advances near the end of its travel, it engages the stop 222 and slides it forwardly against the compression of the spring 255.

Figure 5:
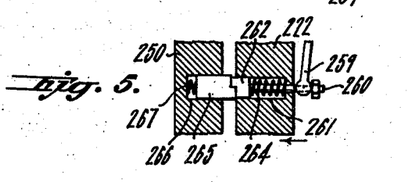
Fig. 5 is an enlarged detail view of a portion of the mechanism shown in Fig. 4.

A yoke 256 is provided with a pivot 257 (see Fig. 2), seated in a groove 258 on the hub of the stop 222. The free ends of the yoke bear against the end of the sleeve 221 so as to normally tend to turn the yoke in a counterclockwise direction about its pivot 257. This moves a tail piece 259 away or outwardly from the face of the stop 222. As is shown in Fig. 5, the tail piece 259 is connected to a pin 260 extending into a bore 261 in the stop 222. A coil spring 264 is seated in the bore about the pin 260 and bears against the rear wall of the bore and urges a catch 262 outwardly and beyond the face of the stop 222. Normally, the engagement between the yoke and the sleeve 221 overcomes the tension of the spring 264 and it keeps the catch 262 in a retracted position within the body of the stop 222. However, when the stop 222 slides forwardly by operation of the carriage 239, the catch 262 is released to project outwardly from the stop 222. A complementary catch 265 is carried in a bore 266 in the stop 250 and is urged outwardly by a spring 267. The exposed area of the catch 265 is normally made larger than the opening of the bore 261 so that the catch mechanism will not be operable until the catch 262 is projected. It is to be understood that the position of the carriage 239 on the frame 231 is so adjusted that the catches meet slightly before a sufficient number of elements have been fastened to the tape. As soon as the catches 262 and 265 meet, the shaft 218 and the cam 241 begin to turn.

As best shown in Fig. 20, the movement of the cam 241 permits an end of a lever 268 to drop behind the high point of the cam. The lever 268 is urged into its downward position by a spring 269 secured to the frame 231. The downward movement of the lever 268 sets in motion a series of operations preparatory to the skip-feed movement.

The first operation is the movement of the finger 197 to stop the flow of elements in the chute 5. This mechanism is best shown in Figs. 20 and 21.

The lever 268 extends through a slot 270 in the base 1 and is pivotally mounted on a bracket 271 attached to the frame 231. As soon as the lever 268 is released by the cam 241 its other end 272 snaps upwardly, under the pull of spring 269, and strikes the bottom of a plunger 274 mounted in a slideway 275 secured to the base 1. A tension spring 276 normally urges the plunger 274 downwardly toward the end of the lever 272.

Upon engagement of the plunger 274 by the end of the lever 272, the latter is forced upwardly against the tension of the spring 276. A cross bar 277, carried by the plunger 274 is provided with a sloping surface for engaging a complementary surface on a block 278 carried on a slide 279. One end of the slide 279 terminates in a yoke 280 which is attached to the hub 199 carrying the finger 197. Engagement of the sloping surfaces turns the hub to cause the end 198 of the finger 197 to engage the fastener elements, as described, thereby shutting off the flow of elements into the chute. As previously stated, this cutting off should take place sufficiently early so that there will be at least one more clamping stroke of the blades 201 before they cease their operation.

Simultaneously with cutting off the flow of elements by the end 272 of the lever 268, a piece 281 of the lever is pulled above a lug 282 mounted on a slidable clutch collar 284, illustrated in Fig. 2, which is mounted on a shaft 285 carried by bearings 286 and 287 secured beneath the base 1. The clutch collar 284 is slidably keyed to the shaft 285 and is normally urged against the lever 268 by a spring 288. A pinion 289 rotatably mounted on the shaft 285 meshes with the gear 18 secured to the main drive shaft 6. The pinion 289 has complementary clutch teeth for engaging the teeth on the clutch collar 284 so that as soon as the lug 282 is freed, the clutch collar 284 engages the pinion 289 and the shaft 285 begins to turn.

As soon as the shaft 285 begins to turn, a roller 290 carried near one end of the clutch lever 14 is forced out of a detent 291 in a cam 292 secured to the shaft 285 against the pull of a spring 294 thereby turning the lever 14 about its pivot 295 on a bracket 296 attached to the base 1 for disconnecting the teeth 15 and 16. The disengagement of the teeth 15 and 16 frees the pinion 17 and the brakes 29 and 30 bring the shaft 20 to rest immediately. This stops the normal counting and feeding operation and the parts are ready to commence the skip feeding movements.

The skip-feed movements

The shaft 285 is now driven from the shaft 6 at a speed determined by the pinion 289 and the gear 18. A connection from the shaft 285 to the bevelled gear 82 for driving the feed wheel 60 is made through a gear train 297, 300, a shaft 301, and a bevelled gear 302, mounted beneath the base 1. When this connection is made, the feed wheel is driven by the engagement of the end 87 of the pin 86 with the teeth 88 at a much higher rate of speed than when the feed wheel is driven through ratchet wheel 81, thereby saving time in the passing of the bare tap sections through the machine. A gear 304 on the shaft 285 meshes with a gear 305 which is directly keyed to the shaft 218 so that the latter is turned, although the shaft 6 is idle. In order to time the mechanism the re-setting operation of the ratio of the gears 304, 305 is preferably 1 to 1. At the same time the counting mechanism is being re-set.

Initial rotation of the shaft 218 turns a cam 306 on the end of the shaft 218 opposite the gear 305. A flat face 307 on the cam normally engages the end face of the arm 235 thereby lifting the arm and causing it, the plate 234, the rod 236, and the carriage 239 to pivot about the rod 232 against the tension of a spring 308 anchored to an arm 309 projecting from the base 1.

As soon as this lifting action occurs the tooth 243 is freed from the sleeve 221 and the springs 238 are expanded to force the carriage back against the collars 240 to its starting position, as shown in Fig. 4, and breaking the connection between the catches 262 and 265.

Continued rotation of the shaft 218 causes the lever 268 to be progressively raised and brings the flat side of the cam 306 under the flat side of the arm 235 when the carriage is again lowered. When it is lowered, a brake 310 carried by the arm 235 bears against the face of the stop 222 and stops its rotation of the sleeve 217.

Figure 6:
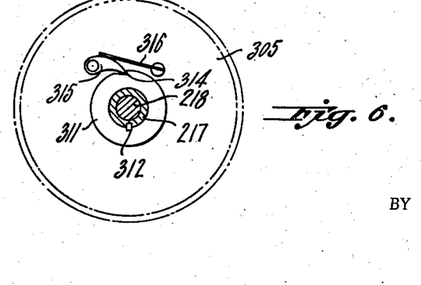
Fig. 6 is a similar view of another detail of the mechanism.

In order to insure that tooth 243 shall be lowered into its proper position in the thread groove of the member 221 at the end of the skip-feeding movement, the construction shown in Fig. 6 is employed. A collar 311 is secured by a key 312 to an extension of the sleeve 217 adjacent the gear 305. The collar 311 is provided with a single tooth 314. A pawl 315 and an engaging spring 316 are mounted on the inner face of the gear 305. After the sleeve 217 ceases to turn by reason of disconnection of catches 262 and 265 and the gear 305 nears the completion of its movement, which is a complete revolution, the pawl riding over the surface of the collar 311 picks the tooth 314 and carries it forward to be in a correct position when the gear 305 ceases to turn and the driving of the sleeve 217 through the ratchet wheel 219 begins, otherwise, incorrect setting due to under-travel or over-travel of the sleeve 217 might be experienced. The brake 310 tends to prevent over-travel of the sleeve.

As the cam 241 turns to bring its high point to nearly the position shown in Fig. 20, the piece 281 is gradually lowered behind the lug 282. As is shown in Fig. 2, the end 272 of the lever 268 is laterally offset so that as the lug 282 advances it is moved rearwardly along the shaft 285 against the compression of the spring 288. Ultimately this forces the collar 284 out of engagement with the pinion 289 thereby stopping the shaft 285. However, just before the shaft 285 is disengaged from the shaft 6, the roller 290 on the lever 14 drops back into detent 291 and the teeth 15 and 16 are brought into engagement, thereby starting the shaft 20 and the connected parts. Upon the completion of this operation the clamping blades 201 begin to reciprocate and the feed wheel 60 advances the tape through the operation of the ratchet wheel 81 from the shaft 6, but no elements are positioned between the blades 201. This avoids any possibility of there being misalignment of elements and of an accumulation of elements on the tape when the normal clamping operation should begin. Preferably, there are several strokes of the blades 201 before any elements are available for clamping.

The mechanism for restoring the flow of elements is illustrated in Figs. 2, 20, and 22. When the lever 268 returns to its operative position the plunger 277 is drawn away from beneath the block 278 by the operation of spring 276. However, the slide 279 remains in the position shown in Fig. 21 and the flow of elements is still stopped by the finger 197, but the carriage 239 begins to advance by the operation of the ratchet wheel 219. A spring finger 317 is mounted on the carriage 239 and bears against a cam face 318 of a lug 319 carried by a bracket 320 secured to the plate 67. A lug 321 is secured to the outer end of the slide 279 and as the finger 317 advances past the cam face 318 it bears against the face of the lug 321 and retracts the slide 279 thereby turning the hub 199 to free the elements from the finger 197. The normal setting operation then proceeds for a desired length of tape.

When the carriage 239 is raised in its re-setting operation the finger 317 is lifted by the carriage from the block or lug 319 and the slide 279 is held in its forward position by the inter-engagement of the arm 277 and the block 278.

Operation

As the detailed operations of the various sub-mechanisms of the device have been explained in detail, it is believed unnecessary to repeat the detailed description of the operation of the machine.

In normal operation of the machine an operator replenishes the stock of the feeding mechanism 34 and the element hopper 120 from time to time. If the machine is operating correctly, very little further attention is needed. If trouble develops in the movement of elements through the chute 5, the operator can usually correct the trouble or stop the machine without having elements applied thereto. The machine may be adapted to different spacings of elements by changing the gearing and timing ratios, although normally the machine is set for one size and spacings of elements and is continuously operated thereafter.

The shaft 20 controls the normal operations of the mechanism and through a system of cams controls the tape feeding wheel 60, the clamping blades 201, and the counting mechanism in proper time. The counting mechanism operates through the finger 197 to stop the flow of elements, and to connect the shaft 218 to the shaft 6 and disconnect the shaft 20 therefrom. One complete revolution of the shaft 285 resets the counting mechanism and accelerates the movement of the feed wheel so that there is material saving of time as the portion of tape to which elements are not applied passes between the blades 201. The counting mechanism nearing the end of its operation re-connects the shaft 20 to the shaft 6 and unconnects the shaft 285, and the shaft 6 rotates continuously. The element feeding mechanism is agitated by the shaft 6 so that the supply of the elements to the chute 5 is continuous. This is desirable as the rapid attachment of the elements to the tape requires a reserve of properly aligned elements at all times. The machine is normally designed to provide approximately 750 clamping strokes per minute, but it is to be understood that the number of strokes may be varied as desired within the spirit of the invention.

The machine is light and is characterized by cam or slight rocking movements in most of the operating parts thereby eliminating heavy reciprocating parts such as have been used heretofore. The machine is sufficiently light so that it may be removed as an entirety when repairs are needed and replaced at the time by a complete machine thereby saving factory operating time. The parts are small and are readily accessible for replacement purposes. The machine handles the smaller size fastener elements satisfactorily and accurately attaches them to a tape.

While we have shown and described the present preferred embodiment of the invention, it is to be understood that the invention may be otherwise incorporated within the spirit thereof and the scope of the appended claims.

Having thus described our invention, what we claim and desire to protect by Letters Patent, is:

1. In a fastener attaching machine, a main drive shaft, a second shaft selectively connectable therewith, element clamping means, tape feeding means, and counting mechanism normally actuated by said second shaft, a third shaft selectively connectable with said main drive shaft for re-setting the counting mechanism and driving the tape feeding means at a different speed, and means controlled by the counting mechanism for controlling the connection between the main drive shaft and the second and third mentioned shafts.

2. In a fastener attaching machine, a main drive shaft, a second shaft selectively connectable therewith, element clamping means, tape feeding means, and counting mechanism normally actuated by said second shaft, a third shaft selectively connectible with said main drive shaft for re-setting the counting mechanism and driving the tape feeding means at a different speed, and means controlled by the counting mechanism for controlling the flow of elements in the machine and for selectively connecting the second and third mentioned shafts to the main driving shaft.

3. In a fastener element attaching machine, means for periodically applying fasteners to a tape, a tape feeding mechanism comprising a wheel about which the tape passes, a belt for pressing the tape against the wheel, and means for driving the wheel at one speed during the application of fasteners to the tape and at a higher speed during periods of inactivity of the fastener applying means.

4. In a fastener element attaching machine, fastener applying means having periods of activity interrupted by periods of dwell, tape feeding mechanism comprising a wheel about which the tape passes, a belt for pressing the tape against the wheel, means for automatically tensioning the belt, and means for driving the wheel at different speeds during the periods of activity and dwell of the fastener applying means.

5. A tape feeding mechanism comprising a feed wheel, means for driving the feed wheel, a belt, having pulleys disposed to train a reach of the belt around a portion of the circumference of the wheel and clamp tape thereagainst, and means for tensioning the belt comprising a pulley, an eccentric mounting therefor and a spring connected to the eccentric mounting.

6. An element fastening mechanism comprising element clamping means, operating means therefor, means for producing periods of dwell in the operation of the clamping means, a tape engaging wheel, a shaft for actuating the wheel, a ratchet wheel attached to the shaft for normal operation thereof, a cooperating pawl, a gear mounted on said shaft, means to actuate the gear during the periods of dwell, and means connected to said shaft to permit idling of the gear when the shaft is being operated in one direction by the ratchet wheel and to actuate the shaft in the same direction when the gear is positively driven.

7. In a machine for attaching fastener elements, a chute down which the elements flow under the influence of the force of gravity, one of the edges of said chute being bevelled, a flexible finger having an end shaped to engage a portion of the fastener elements disposed adjacent said bevelled surface, and means for supporting and actuating the finger to cause it to engage the bevelled edge of the chute and clamp the fastener elements against the inner surface of the chute thereby stopping the flow of the elements in the chute.

8. In a machine for attaching fastener elements, a chute down which elements flow under the influence of the force of gravity, one of the edges of said chute being bevelled, a flexible finger having an end shaped to engage a portion of the fastener elements disposed adjacent said bevelled surface, means for supporting and actuating the finger to cause it to engage the bevelled edge of the chute and clamp the fastener elements against the inner surface of the chute thereby stopping the flow of the elements in the chute, element clamping means, and timing mechanism for controlling the operation of the clamping means and said finger.

9. In a machine for attaching fastener elements, a chute down which elements flow under the influence of the force of gravity, one of the edges of said chute being bevelled, a flexible finger having an end shaped to engage a portion of the fastener elements disposed adjacent said bevelled surface, means for supporting and actuating the finger to cause it to engage the bevelled edge of the chute and clamp the fastener elements against the inner surface of the chute thereby stopping the flow of the elements in the chute, element clamping means, a timing mechanism for controlling the operation of the clamping means and said finger, said timing mechanism being normally set to cause the said finger to interrupt the flow of elements prior to periodical stopping of the clamping means and to retain the elements after the clamping means has again commenced to operate.

10. An element setting machine comprising an element feeding chute, a clamping mechanism, tape feeding mechanism and counting mechanism associated therewith, and a supporting base therefor, the surface of the supporting base being normally disposed at an angle to the horizontal and the chute being normally perpendicular to said face whereby the force of gravity acting on elements traversing the chute tends to cause the elements to bear against the rear face of the chute while the various mechanisms are generally in rectangular relation to the face of the support.

11. A fastener element sorting mechanism comprising a housing, a roll mounted therein in an inclined position, means for storing elements, each having a projecting lug on one face, in bulk and discharging them in a thin stream into a space defined by an inclined space wall of the housing and said roll, said roll having a groove of dimensions slightly greater than the dimensions of the projecting lugs on the elements, and means for rotating the roll, whereby elements falling into the space between the roll and wall with their lugs engaging the wall are retained in a suspended position and elements falling into the space between the roll and the wall with their lugs projecting towards said groove, move into the groove and fall through the space between the roll and the wall, thereby correctly aligning the elements.

12. A fastener element sorting mechanism comprising a rotating roll having a groove on its surface slightly larger than the dimensions of a projecting lug on each of the fastener elements to be sorted, but less in width than other dimensions of the elements, and a spaced wall having a lug engaging and supporting surface, whereby elements falling between the roll and wall with the lugs projecting against the wall are retained in a suspended condition by said surface between the roll and the wall and elements whose lugs project away from the wall fall through the space between the roll and the wall when the lugs engage the groove.

13. A fastener element sorting mechanism comprising a rotating roll having a groove on its surface slightly larger than the dimensions of a projecting lug on each of the fastener elements to be sorted, but less in width than other dimensions of the elements, and an inclined spaced wall whereby elements falling between the roll and the wall with the lugs projecting toward the wall are retained and move along the wall, and elements whose lugs project toward the roll fall through the space when the lugs engage the groove.

14. A fastener element sorting mechanism comprising a roll having a groove on its surface slightly larger than the dimensions of a projecting lug on each of the fastener elements to be sorted, but less in width than other dimensions of the elements, and a spaced wall, both the wall and roll being disposed in an inclined position, whereby elements falling between the roll and wall, with the lugs projecting toward the wall are retained, and elements whose lugs project toward the roll fall through the space when the lugs engage the groove, and means for imparting vibratory motion thereto.

15. A fastener element sorting mechanism comprising a housing, a roll mounted therein in an inclined position, means for storing elements, each having a projecting lug on one face, in bulk and discharging them in a thin stream into a space defined by a spaced wall of the housing and said roll, said roll having a groove of dimensions slightly greater than the dimensions of the projecting lugs on the elements, means for rotating the roll whereby elements falling into the space between the roll and wall with their lugs engaging the wall are retained in a suspended position and elements falling into the space between the roll and the wall with their lugs projecting towards said groove fall through the space between the roll and the wall, thereby correctly aligning the elements, and means for receiving fallen elements discharged from the housing.

16. A mechanism for feeding fastener elements, each having a lug projecting from one face, comprising an inclined member along one edge of which the elements move while suspended by the lugs, said edge terminating in a shelf slightly below the level of the edge and of a dimension to support a single element, means for vibrating the member, and a chute into which the aligned elements are fed having a slot for receiving the lugs of the elements, said slot at its element receiving end terminating in a laterally offset portion opposite said shelf, whereby the elements are successively pushed off the shelf into the slot without a turning movement.

17. In a fastener element feeding mechanism a sloping horizontally extending member having an edge along which fastener elements move while suspended by outwardly extending lugs, and a vertically extending chute having a slot for receiving the elements with an opening for accommodating the lugs on the elements, the end of the member overhanging said opening and terminating in a ledge forming an edge of the slot opening, and said slot opening being offset and curved opposite said ledge whereby succeeding elements are pushed into the slot opening while being suspended by their respective lugs and in proper alignments for movement down the chute.

18. The combination with a fastener element setting machine comprising a selectively driven actuating shaft, and an actuated mechanism for feeding tape and clamping fastener elements thereon, of an unreeling mechanism for the tape associated with said machine and means actuated from said shaft for driving said mechanism whereby the unreeling mechanism is synchronized with the tape feeding and element setting means.

19. A fastener feeding and clamping means, mechanism comprising a chute having an opening for the passage of tape, a slot for positioning legged fastener elements with the lowermost element astride the edge of the tape and with succeeding elements supported by the element astride the tape, supporting plates for the ends of the straddling legs secured to the lower face of the chute, plates for securing the succeeding elements in the chute and in substantial alignment with the supporting plates, and reciprocating clamping blades of a width slightly less than the height of the elements mounted for clamping the elements to the tape edge operating in the spaces between the ends of the plates securing the elements in the chute and the plates supporting the ends of the element straddling the tape.

20. A pusher mechanism for feeding slide fastener elements comprising a thin blade having an end shaped to engage an end of a fastener element, a resiliently mounted plunger supporting the blade, a second resiliently mounted plunger for supporting the first mentioned plunger, and means for actuating the second mentioned plunger, and a housing therefor.

21. A pusher mechanism for feeding slide fastener elements comprising a thin blade having an end shaped to engage an end of a fastener element, a resiliently mounted plunger supporting the blade, a second resiliently mounted plunger for supporting the first-mentioned plunger, means for actuating the second-mentioned plunger, a housing therefor having its inner face adjacent the outer face of said second-mentioned plunger cut away to form a loose fit therewith, and a spring mounted on said housing and bearing against the extending end of second-mentioned plunger whereby the blade is permitted resilient movement both longitudinally and laterally.

22. A pusher mechanism for slide fastener elements comprising a housing, a plunger resiliently mounted thereon and having reciprocating motion, an inner wall of the housing adjacent said plunger being cut away to permit lateral movement of the plunger, a spring carried by the housing and bearing against an extended end of said plunger whereby the plunger is capable of resilient movement both longitudinally and laterally, a second plunger resiliently mounted in the first-mentioned plunger, and a blade having its end shaped to engage slide fastener elements carried by the second-mentioned plunger.

23. A pusher mechanism for slide fastener elements comprising a housing, a plunger resiliently mounted thereon and having reciprocating motion, an inner wall of the housing adjacent said plunger being cut away to permit lateral movement of the plunger, a spring carried by the housing and bearing against an extended end of said plunger whereby the plunger is capable of resilient movement both longitudinally and laterally, a second plunger resiliently mounted in the first-mentioned plunger, a blade having its end shaped to engage slide fastener elements carried by the second-mentioned plunger, and means for depressing the first-mentioned plunger against its resilient support for moving the blade into engagement with slide fastener elements.

24. A timing and re-setting mechanism for a fastener setting mechanism comprising a shaft, means for driving the shaft, a sleeve rotatably mounted on said shaft, means for driving the sleeve independently of the driving shaft means, a grooved member secured to said sleeve, a carriage movable longitudinally of the shaft and sleeve comprising a tooth engaging the groove of said member, and means controlled by the movement of said carriage for securing the sleeve and shaft together whereby the sleeve and shaft may be separately driven at different times and may be engaged for simultaneous movement during other operations.

25. A counting mechanism for a slide fastener element setting machine comprising a shaft, a gear secured to the shaft for driving it, a sleeve rotatably mounted on said shaft, a member having a grooved surface secured to said sleeve and rotatable therewith, a member having a tooth engaging said groove and movable longitudinally of the shaft upon rotation of the sleeve, means for turning the sleeve independently of the shaft during the element setting periods of the machine, means actuated by the longitudinally moving element for securing the shaft and sleeve together, and means responsive to the movement of the shaft when so locked to the sleeve for interrupting the movement of the sleeve turning means and actuating the gear attached to the shaft.

26. A counting mechanism for a slide fastener element setting machine comprising a shaft, a gear secured to the shaft for driving it, a sleeve rotatably mounted on said shaft, a grooved surface secured to said sleeve and rotatable therewith, a member having a tooth engaging said groove and movable longitudinally of the shaft upon rotation of the sleeve, means for turning the sleeve independently of the shaft during the element setting periods of the machine, means actuated by the longitudinally moving element to lock the shaft and sleeve, means responsive to the movement of the shaft when so locked to the sleeve for interrupting the movement of the sleeve turning means and actuating the gear attached to the shaft, and means responsive to continued movement of said shaft for disengaging the actuating gear and restoring the independent movement of the sleeve and associated parts.

27. A counting mechanism for a slide fastener element setting machine, comprising a shaft, a gear secured to the shaft for driving it, a sleeve rotatably mounted on said shaft, a grooved surface secured to said sleeve and rotatable therewith, a member having a tooth engaging said groove and movable longitudinally of the shaft upon rotation of the sleeve, a ratchet wheel for turning the sleeve independently of the shaft during the element setting periods of the machine, means actuated by the longitudinally moving element for securing the shaft and sleeve together, and means responsive to the movement of the shaft when so locked to the sleeve for interrupting the movement of the sleeve turning ratchet wheel and actuating the gear attached to the shaft.

28. A counting mechanism for a slide fastener element setting machine comprising a shaft, a gear secured to the shaft for driving it, a sleeve rotatably mounted on said shaft, a grooved surface on said sleeve and rotatable therewith, a member having a tooth engaging said groove and movable longitudinally of the shaft upon rotation of the sleeve, a ratchet wheel for turning the sleeve independently of the shaft during the element setting periods of the machine, means actuated by the longitudinally moving element for locking the shaft and sleeve, means responsive to the movement of the shaft when so locked to the sleeve for interrupting the movement of the sleeve turning ratchet wheel and actuating the gear attached to the shaft, and means responsive to continued movement of said shaft for disengaging the actuating gear and restoring the independent movement of the sleeve and associated parts.

29. A counting and re-setting mechanism for a slide fastener setting mechanism comprising a shaft, a sleeve rotatably mounted thereon, a pivotally mounted frame straddling said shaft and sleeve, a carriage mounted on said frame for movement longitudinally of the shaft in response to the turning movement of the sleeve, resilient means for opposing movement of the carriage, means for normally turning the sleeve, means responsive to the movement of the carriage for connecting the sleeve and shaft, means responsive to the movement of the shaft when so connected with the sleeve for discontinuing movement of the sleeve and connecting the shaft to a source of power, means responsive to movement of the shaft for turning the frame to release the carriage whereupon the resilient means expands and returns the carriage to its initial position relative to the sleeve, and means for disengaging the shaft from the source of power and restoring a driving connection to the sleeve.

30. A counting mechanism for a slide fastener element setting machine comprising a mechanism normally actuated in synchronism with the element setting operations of the machine, means operable after a predetermined number of setting operations to connect the first mechanism to a second mechanism for driving component parts of the machine at a different speed, means associated with the second mechanism permitting the re-setting of the first mechanism and for restoring the first mechanism to its operating condition at the end of a definite movement of the second mechanism.

31. A counting mechanism for a slide fastener setting machine comprising a shaft, a sleeve rotatably mounted thereon and carrying a groove on its outer surface, a ratchet wheel for turning the sleeve, a carriage mounted for longitudinal movement of the shaft in accordance with the turning movement of the sleeve, springs resisting the longitudinal movement of the carriage, means controlled by the movement of the carriage for connecting the shaft and the sleeve whereby the sleeve initially drives the shaft, means rendered operative upon the movement of the shaft for connecting the shaft to a source of power and stopping the actuation of the sleeve, means rendered operative upon the movement of the shaft for releasing the carriage from the grooved surface and permitting it to return to its initial position by reason of expansion of the springs and also disengaging the driving connection between the shaft and the sleeve, and means rendered operative upon further movement of the shaft for disengaging the shaft from the source of power thereby controlling the cycle of operations of the connected apparatus.

32. A slide fastener setting machine comprising a continuously driven power shaft, a second shaft, element setting means and tape feeding means connected to the second shaft, a third shaft for driving the tape feeding means at a different speed selectively connectible to the power shaft, counting mechanism for controlling the connection of the second and third mentioned shafts to the main power shaft comprising a shaft connected to the third-mentioned shaft, a sleeve mounted on the last-mentioned shaft and rotatable relative thereto, means for rotating the sleeve in accordance with the movement of the second-mentioned shaft and in synchronism with the movement of the clamping mechanism and the normal movements of the tape feeding mechanism, and means controlled by the movement of the sleeve for connecting the sleeve and associated shaft and causing them to move as a unit, means brought into operation by the counting mechanism while the sleeve and the shaft are connected for connecting the third-mentioned shaft to the main drive shaft and disconnecting the second-mentioned shaft from the main drive shaft, means operable upon continued movement of the third-mentioned shaft to permit re-setting of the counting mechanism and the release of the sleeve and its associated shaft, and means responsive to further movement of the third-mentioned shaft for disconnecting it from the main source of power and connecting the second-mentioned shaft to the source of power for completing the cycle of operation of the machine.

33. A slide fastener setting machine comprising a continuously driven power shaft, a second shaft, element setting means and tape feeding means connected to the second shaft, a third shaft for driving the tape feeding means at a different speed selectively connectible to the power shaft, and counting mechanism for controlling the connection of the second and third mentioned shafts to the main power shaft comprising a shaft connected to the third-mentioned shaft, a sleeve mounted on the last-mentioned shaft and rotatable relative thereto, means for rotating the sleeve in accordance with the movement of the second-mentioned shaft and in synchronism with the movements of the clamping mechanism and the normal movements of the tape feeding mechanism, and means controlled by the movement of the sleeve for connecting the sleeve and the associated shaft and causing them to move as a unit, means brought into operation by the counting mechanism while the sleeve and shaft are connected for connecting the third-mentioned shaft to the main drive shaft and disconnecting the second-mentioned shaft from the main drive shaft, means operable upon continued movement of the third-mentioned shaft to permit re-setting of the counting mechanism and the release of the sleeve and its associated shaft, means responsive to further movement of the third-mentioned shaft for disconnecting it from the main source of power and connecting the second-mentioned shaft to the source of power for completing the cycle of operations of the machine, and means for controlling the supply of slide fastener elements to the clamping means actuated by the counting mechanism.

34. In a slide fastener setting machine, a main power shaft, a second shaft selectively connectible thereto, fastener element setting means actuated by the second-mentioned shaft, tape feeding means connected to the second-mentioned shaft for one speed of operation, a third shaft selectively connectible to the main drive shaft for driving the tape feeding means at a higher speed, and means for controlling the connections of the second and third mentioned shafts with the power shaft comprising a cam actuated lever, a cam for operating the lever, means for actuating the said cam comprising a shaft on which the cam is mounted, a sleeve rotatably mounted on the shaft, means for normally driving the sleeve from the second-mentioned shaft, and means operable upon movement of said sleeve for connecting the sleeve and shaft to turn the cam, and connecting means between the main drive shaft and the second and third mentioned shafts responsive to the position of said lever for initially disconnecting the second shaft, connecting the third-mentioned shaft to the power shaft, driving the cam supporting shaft and subsequently restoring the original connections thereby completing a cycle of operations of the machine.

35. In a counting mechanism for a slide fastener setting machine a normally idle shaft, a sleeve rotatably mounted on the shaft, means for turning the sleeve a predetermined amount in accordance with the operation of a related mechnism, means rendered operable near the end of a predetermined movement of the sleeve for connecting the sleeve and shaft, means rendered operable upon the connection of the sleeve and shaft for disconnecting the sleeve and connecting the shaft to a source of power, movement of the shaft permitting the disconnection of the shaft and sleeve and cooperating means carried by the shaft and sleeve for insuring the proper positioning of the sleeve at the end of a predetermined movement of the shaft, continued movement of the shaft serving to disconnect it from the source of power and reconnect the sleeve to the source of power.

36. In a slide fastener element setting mechanism, a base plate having a pedestal for the reception of a chute extending at substantially right angles thereto and having a slot shaped in cross section to permit the passage of elements in single file, and pairs of legs of unequal lengths for the base plate, the pair of longer legs being disposed in front of the chute pedestal whereby the mounted chute, while in rectangular relation to the base plate, is mounted at an angle to the horizontal to cause the elements in the chute to bear against the rear wall thereof.

CARL ANDERSON.
GEORGE B. BAEHR.
GILMAN M. GAY.
CHARLES T. MANVILLE.